United States Patent Office 2,900,397
Patented Aug. 18, 1959

2,900,397

PROCESS FOR MANUFACTURING ALPHA-ANTHRAQUINONESULFONATES CONTAINING LOW AMOUNTS OF MERCURY

Robert D. Donaldson, Nixon, N.J., assignor to General Aniline & Film Corporation, New York, N.Y., a corporation of Delaware No Drawing. Application December 30, 1957
Serial No. 705,740

2 Claims. (Cl. 260—370)

The invention here presented is a new and useful process for the removal of catalytic mercury from sulfonated materials, particularly from 1,8-anthraquinone disulfonic acid; whereby the amount of mercury combined into the compound is reduced to less than 100 parts per million, and whereby the residual amount of mercury in derivatives thereof is reduced well below the minimum amount specified by the National Formulary.

In the preparation of alpha-sulfonates, as by the sulfonation of anthraquinone, two different reactions occur. In the presence of mercury or mercury compounds the sulfonate substituent goes into the alpha position, whereas in the absence of mercury or mercury compounds the sulfonate goes into the beta position. This series of reactions is well shown in United States Patent No. 2,742,484, issued to Albert Bloom. Accordingly, when alpha sulfonates are prepared, considerable quantities of mercury or its salts are used to catalyze the reaction and force sulfonate substituents into the alpha positions. However, the reaction rarely goes to completion, and considerable amounts of mercury remain combined in the anthraquinonedisulfonate which has been found to be extremely difficult to remove. The above-mentioned patent shows that by the addition of substantial amounts of halogen acid the interference of the mercury in subsequent reactions can be neutralized, but the mercury tends strongly to remain combined in the subsequent compounds, and may be present even in the amount of several percent, as is well shown by the mentioned patent. Such compounds are severely poisonous, and must not be used under circumstances where they might be eaten by man or animals. Accordingly, the use of compounds so prepared is sharply limited by the presence of mercury which usually cannot be removed by any reasonable treatment known to the prior art.

One of the major uses for 1,8-anthraquinone disulfonic acid is for use as an intermediate for the preparation of chrysazin, which, in turn, is used as an intermediate in the manufacture of alizarin and indanthrene dyestuffs, and also for medicinal use as a cathartic. For this latter use it is almost imperative that the amount of mercury retained in the compound be brought to the lowest possible value to avoid mercury poisoning on the part of patients for whom it is prescribed.

The present invention provides a simple, easy, and inexpensive purification procedure by which the mercury can be removed from such sulfonates by the simple procedure of suspending the compound, in relatively finely divided condition, in a water solution of potassium iodide. This procedure reduces the amount of mercury retained in the sulfonate compound to amounts well below 100 parts per million. The preparation of the chrysazin then permits of a further reduction in mercury content to bring the amount of mercury well below 10 parts per million, which is acceptable to the American Formulary. It may be noted that this compound, chrysazin, is on the market under several trade names, such as "Istizin" and "Colonaid." It may be noted that when the material, the 1,8-anthraquinone disulfonic acid, is used as a dyestuff intermediate, it usually is helpful to the subsequent reactions if the amount of mercury present is small, and it renders such dyestuffs safer on fabrics to be used as garments for small children.

In the manufacture of chrysazin it is customary to prepare the 1,8-anthraquinone disulfonic acid by the sulfonation of anthraquinone in the presence of mercury to substitute into the molecule the desired sulfonic acid groups in the alpha positions. A substantial amount of mercury always remains combined in the compound, and the amount may, on occasion, be as high as one percent or even more, thereby producing a strongly poisonous compound. The reaction liquors are then diluted with water, after first removing the 1,5-anthraquinone disulfonic acid which is also formed. This may be done by diluting the reaction mixture with water in an amount sufficient to precipitate the less soluble 1,5-anthraquinone disulfonic acid, which may then be removed by filtration. The desired 1,8-anthraquinone disulfonic acid is converted to the potassium salt by the addition of potassium chloride, and the relatively insoluble potassium salt is removed by filtration. The resulting potassium compound ordinarily contains from 0.5 percent to 0.8 percent, or even more, of mercury on the dry basis. Under the prior practice this compound was then fused with hydrated lime or the like, producing the desired chrysazin, which was then obtained by dissolving the fused mass in water, acidifying to precipitate the chrysazin and then washing the chrysazin with water and filtering out the precipitated compound. The precipitate is then dried and purified by sublimation. However, the mercury, either as metal or as salts, being readily volatile, passes through all of the purification steps with the chrysazin and is present as a very undesirable impurity.

According to the present invention, it is now found that if the precipitated 1,8-dipotassium anthraquinonesulfonate is, after being slurried in water and filtered out, reslurried in a potassium iodide solution and boiled for a substantial length of time, usually from one-half to six or eight hours, preferably about two hours, by this procedure the mercury is quite completely removed from the compound and dissolved in the water, probably as potassium mercury iodide. The treated dipotassium anthraquinonedisulfonate may then be filtered out, washed with additional quantities of water to remove the last traces of potassium iodide and mercury salt, whereafter the dipotassium salt is dried and the usual fusion reaction conducted. This procedure, depending upon the length of time of boiling, will reduce the amount of mercury present to a quantity well below 100 parts per million. By this additional step in the standard procedure, a chrysazin is produced which is so nearly free of mercury or its compounds as to be well within the requirements of the National Formulary as to be entirely acceptable as a food component.

It may be noted that the mercury is chemically combined in the anthraquinone-disulfonate molecule and no amount of washing in water will effect any substantial removal of mercury.

The following examples are shown as the preferred method of practicing the invention, and the preferred material upon which to practice the invention, but are not to be construed as limitations upon the scope of the invention.

*Example 1*

208 parts by weight dipotassium 1,8-anthraquinonedisulfonate (as free acid, M.W.=368) is slurried in 500 parts by weight of water. To the slurry add 15.6 parts by weight potassium iodide. Heat the slurry to a boil and hold with stirring for two hours. Cool to 50–55° C.

and filter. Wash the cake with enough saturated potassium chloride solution to remove mother liquors. The product cake is dried and analyzed for mercury and it is found to contain only 0.0069% mercury as compared to 0.45% mercury in the starting material (dry basis).

This treated 1,8-dipotassium-anthraquinonedisulfonate when processed to chrysazin gave a final chrysazin product containing less than 2 parts mercury per million.

*Example II*

It was found that a mol ratio of potassium iodide to mercury of 4.5/1 to 5/1 based on the amount of mercury in the 1,8-dipotassium anthraquinonedisulfonate was the minimum amount of potassium iodide to be used to completely solubilize the mercury present so it can be removed from the product by washing with water.

This invention is a general one for the removal of catalytic mercury from sulfonates in general, and is applicable to any product produced by sulfonation in the presence of a mercury catalyst.

Thus the invention removes combined catalytic mercury from a sulfonate compound by the step of boiling the mercury-containing compound in a potassium iodide solution.

While there are above disclosed but a limited number of embodiments of the invention, it is possible to produce still other embodiments without departing from the inventive concept herein disclosed, and it is therefore desired that only such limitations be imposed upon the appended claims as are stated or required by the prior art.

The invention claimed is:

1. A method of removing mercury from anthraquinonesulfonates obtained by the sulfonation of anthraquinone in the presence of mercury which comprises slurrying the potassium salt of said mercury-containing anthraquinonesulfonate in water, adding potassium iodide to said slurry in an amount of at least 4.5 molar proportions of potassium iodide to one molar proportion of mercury, boiling said slurry for a substantial period of time, whereby the mercury is solubilized in the water and recovering the potassium salt of the anthraquinonesulfonate from the water.

2. The method of removing mercury from dipotassium 1,8-anthraquinonedisulfonate obtained by the sulfonation of anthraquinone in the presence of mercury which comprises slurrying said mercury-containing dipotassium 1,8-anthraquinonedisulfonate in water, incorporating in said slurry at least 4.5 molar proportions of potassium iodide for each molar proportion of mercury, heating said slurry to the boil whereby the mercury is dissolved in the water and recovering the dipotassium 1,8-anthraquinonedisulfonate free of mercury from the water.

References Cited in the file of this patent

UNITED STATES PATENTS 2,742,484     Bloom _____ Apr. 17, 1956

FOREIGN PATENTS

544     Great Britain _____ June 2, 1910
of 1910